United States Patent
Huo et al.

(10) Patent No.: US 9,416,307 B2
(45) Date of Patent: Aug. 16, 2016

(54) METHOD AND COMPOSITION FOR INHIBITING WAX IN A HYDROCARBON MIXTURE

(71) Applicant: SHELL OIL COMPANY, Houston, TX (US)

(72) Inventors: Zhongxin Huo, Katy, TX (US); Timothy Michael Shea, The Woodlands, TX (US); Cornelis Antonius Theodorus Kuijvenhoven, Katy, TX (US); Ying Zhang, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 14/366,801

(22) PCT Filed: Dec. 17, 2012

(86) PCT No.: PCT/US2012/070136
§ 371 (c)(1),
(2) Date: Jun. 19, 2014

(87) PCT Pub. No.: WO2013/096217
PCT Pub. Date: Jun. 27, 2013

(65) Prior Publication Data
US 2015/0218434 A1    Aug. 6, 2015

Related U.S. Application Data

(60) Provisional application No. 61/578,334, filed on Dec. 21, 2011.

(51) Int. Cl.
*E21B 37/06* (2006.01)
*E21B 43/22* (2006.01)

(Continued)

(52) U.S. Cl.
CPC . *C09K 8/52* (2013.01); *C09K 8/524* (2013.01); *E21B 37/06* (2013.01)

(58) Field of Classification Search
CPC ........................ E21B 37/06; C09K 8/52–8/524
See application file for complete search history.

(56) References Cited

U.S. PATENT DOCUMENTS

| | | |
|---|---|---|
| 3,275,554 A | 9/1966 | Wagenaar |
| 3,438,757 A | 4/1969 | Honnen et al. |
| 3,565,804 A | 2/1971 | Honnen et al. |

(Continued)

FOREIGN PATENT DOCUMENTS

| | | |
|---|---|---|
| EP | 0164817 A2 | 12/1985 |
| GB | 839112 | 6/1960 |

(Continued)

OTHER PUBLICATIONS

Wu et al., Salting-Out Effect of Ionic Liquids on Poly(propylene glycol) (PPG): Formation of PPG + Ionic Liquid Aqueous Two-Phase Systems J. Chem. Eng. Data 2010, 55, 5004-5008 (published online Sep. 15, 2010).*

(Continued)

*Primary Examiner* — Zakiya W Bates

(57) ABSTRACT

A method of inhibiting the formation or deposition of wax in a mixture comprising hydrocarbons, the method comprising contacting the mixture with a composition which comprises at least one ionic liquid. The ionic liquid is preferably a polyamine salt derivative or a polypropylene glycol derivative.

11 Claims, 1 Drawing Sheet

(51) Int. Cl.
*C09K 8/52* (2006.01)
*C09K 8/524* (2006.01)

(56) References Cited

U.S. PATENT DOCUMENTS

| | | |
|---|---|---|
| 3,755,433 A | 8/1973 | Miller et al. |
| 3,822,209 A | 7/1974 | Knapp et al. |
| 3,996,059 A | 12/1976 | Stansfield et al. |
| 4,224,212 A | 9/1980 | Topham |
| 4,349,389 A | 9/1982 | Schofield |
| 4,882,034 A | 11/1989 | Tack et al. |
| 5,000,792 A | 3/1991 | Ohta et al. |
| 5,425,422 A | 6/1995 | Jamaluddin et al. |
| 5,484,488 A * | 1/1996 | Hart ............... C09K 8/524 134/22.13 |
| 5,536,445 A | 7/1996 | Campbell et al. |
| 5,646,212 A | 7/1997 | Hibbert |
| 5,753,022 A | 5/1998 | Schofield et al. |
| 5,833,721 A | 11/1998 | Hart et al. |
| 5,855,629 A | 1/1999 | Grundy et al. |
| 5,858,927 A | 1/1999 | Poelker et al. |
| 6,444,784 B1 | 9/2002 | Patil et al. |
| 7,097,759 B2 | 8/2006 | Mukkamala |
| 7,795,183 B2 | 9/2010 | Wilkes et al. |
| 2002/0033265 A1 | 3/2002 | Varadaraj |
| 2007/0042911 A1 | 2/2007 | Fletcher |
| 2010/0084597 A1 | 4/2010 | Schwab et al. |
| 2011/0092393 A1 | 4/2011 | Faust et al. |
| 2011/0207640 A1 | 8/2011 | Carty et al. |

FOREIGN PATENT DOCUMENTS

| | | |
|---|---|---|
| GB | 1342746 | 1/1974 |
| GB | 1373660 | 11/1974 |
| JP | 2007112828 | 5/2007 |
| WO | 2005100517 A1 | 10/2005 |
| WO | 2006111712 A2 | 10/2006 |
| WO | 2010014678 A1 | 2/2010 |
| WO | 2010015706 A1 | 2/2010 |

OTHER PUBLICATIONS

Visak et al., "Ionic Liquids in Polyethylene Glycol Aqueous Solutions: Salting-in and Salting-out Effects", Monatshefte fur Chemie 138, 1153-1157 (2007) (published online Jul. 13, 2007).*

PCT International Search Report, Application No. PCT/US2012/070136 dated Apr. 25, 2013.

Morao, A. etal. 'Effect of antifoam addition on gas-liquid mass transfer in stirred fermenters.' Bioprocess Engineering, 1999, vol. 20, pp. 165-172.

Predel, T. et al. 'Ionic Liquids as Alternative Lubricants for Special Applications.' Chemical Engineering & Technology, 2010, vol. 33, No. 1, pp. 132-136.

Jose-Alberto, M. et al. 'Current Knowledge and Potential Applications of Ionic Liquids in the Petroleum Industry' Ionic Liquides : Applications and Perspectives. Feb. 21, 2011, Chapter 18, pp. 439-458.

* cited by examiner

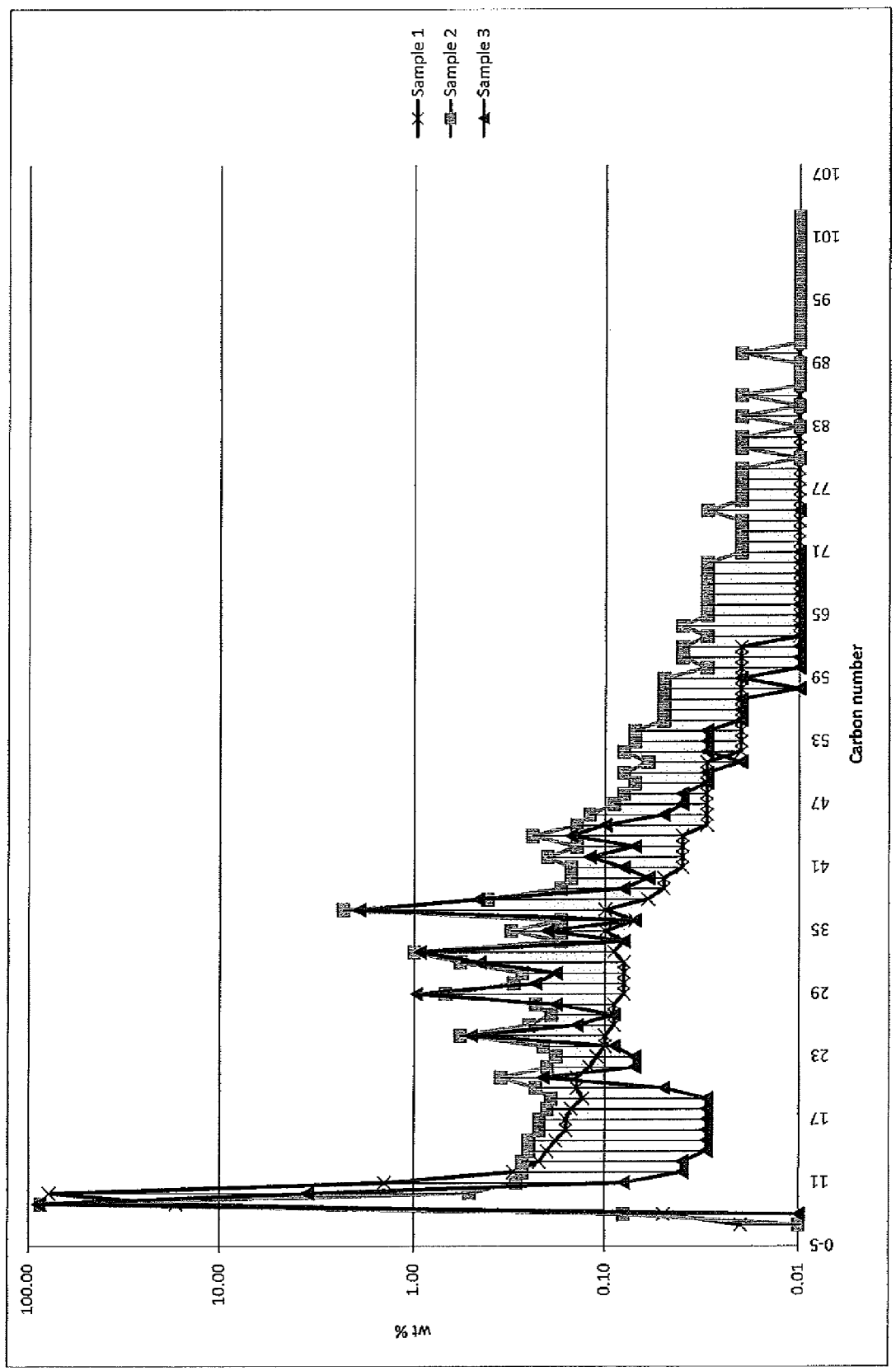

METHOD AND COMPOSITION FOR INHIBITING WAX IN A HYDROCARBON MIXTURE

PRIORITY CLAIM

The present application is a National Stage (§371) application of PCT/US2012/070136, filed Dec. 17, 2012, which claims priority from U.S. Provisional Application 61/578,334, filed Dec. 21, 2011, each of which are hereby incorporated by reference in their entirety.

FIELD OF THE INVENTION

The invention relates to methods and compositions for inhibiting the deposition of wax in a hydrocarbon mixture and in one embodiment to methods and compositions for inhibiting the deposition of wax during the production of oil and gas.

BACKGROUND

Crude oil produced from production wells often contains waxy components that "freeze" to form wax crystals that can adhere to the pipe or conduit and subsequently block the pipe. The wax present in crude oils primarily consists of paraffin hydrocarbons ($C_{18}$-$C_{36}$) known as paraffin wax and naphthenic hydrocarbons ($C_{30}$-$C_{60}$).

When the temperature of the crude oil is lowered, which occurs when the oil is produced from a well deep under the surface of the ocean, crystals of wax begin to form on the walls of the pipe. Wax crystals can then continue to grow in size until the whole inner wall is covered. The partial blockage of the pipe requires additional pressure to move the hydrocarbons through the pipe and could eventually result in complete blockage of the pipe.

SUMMARY OF THE INVENTION

This invention provides a method of inhibiting the formation or deposition of wax in a mixture comprising hydrocarbons, the method comprising contacting the mixture with a composition which comprises at least one ionic liquid.

This invention further provides a composition for inhibiting the formation or deposition of wax in a hydrocarbon mixture which comprises at least one ionic liquid.

This invention also provides a foam inhibited mixture comprising water, hydrocarbons, and a composition comprising at least one ionic liquid.

BRIEF DESCRIPTION OF THE FIGURES

FIG. 1 shows the results for the carbon number distribution of the samples in Example 1.

DETAILED DESCRIPTION OF THE INVENTION

The present invention is directed to a method of treating hydrocarbons produced from oil and gas production wells. These hydrocarbons are prone to forming and depositing wax deposits during the production, transport and processing steps which these hydrocarbons undergo. The present invention addresses this problem by treating the hydrocarbons with a composition comprising one or more ionic liquids. The ionic liquid(s) may be combined with additional components known to those of ordinary skill in the art that are useful for treating hydrocarbons produced from hydrocarbon production wells.

Ionic liquids are generally defined as molten salts which are liquid at room temperature or by definition have a melting point of less than 100° C. They have virtually no vapor pressure and can exhibit high thermal stability. As the term ionic liquids is used in this application, it may apply to the above described molten salts or to the salts dissolved in solution, aqueous or otherwise.

An ionic liquid can be presented by the formula $C^+A^-$ wherein $C^+$ is a suitable cation and $A^-$ is a suitable anion.

A preferred embodiment of an ionic liquid is a polyamine salt derivative. The polyamine salt derivative(s) may be combined with additional components known to those of ordinary skill in the art that are useful for treating hydrocarbons produced from hydrocarbon production wells.

One embodiment of a suitable polyamine salt derivative has the general chemical formula (I):

wherein A is a divalent optionally substituted hydrocarbyl group, n is from 1 to 100, m is from 1 to 4, q is from 1 to 4 and p is an integer such that pq=m and $X^{q-}$ is an anion.

In formula (I), A is preferably a divalent straight chain or branched hydrocarbyl group. That is to say, in formula (I), A is preferably an optionally substituted aromatic, aliphatic or cycloaliphatic straight chain or branched divalent hydrocarbyl group. More preferably, A is an arylene, alkylene or alkenylene group, in particular an arylene, alkylene or alkenylene group containing in the range of from 4 to 25 carbon atoms, more preferably in the range of from 6 to 25 carbon atoms, more preferably in the range of from 8 to 24 carbon atoms, more preferably in the range of from 10 to 22 carbon atoms, and most preferably in the range of from 12 to 20 carbon atoms.

In the compound of formula (I), the optional substituents in the group A are preferably selected from hydroxy, halo or alkoxy groups, especially $C_{1-4}$ alkoxy groups.

For example, the optionally substituted hydrocarbyl group A may be conveniently selected from heptyl, octyl, undecyl, lauryl, heptadecyl, heptadenyl, heptadecadienyl, stearyl, oleyl and linoleyl.

Other examples of said optionally substituted hydrocarbyl group A in formula (I) herein include $C_{4-8}$ cycloalkyls such as cyclohexyl; polycycloalkyls such as polycyclic terpenyl groups which are derived from naturally occurring acids such as abietic acid; aryls such as phenyl; aralkyls such as benzyl; and polyaryls such as naphthyl, biphenyl, stibenyl and phenylmethylphenyl.

In the present invention, the optionally substituted hydrocarbyl group A in formula (I) may contain one or more functional groups such as carbonyl, carboxyl, nitro, hydroxy, halo, alkoxy, amino, preferably tertiary amino (no N—H linkages), oxy, cyano, sulphonyl and sulphoxyl. The majority of the atoms, other than hydrogen, in substituted hydrocarbyl groups are generally carbon, with the heteroatoms (e.g., oxygen, nitrogen and sulfur) generally representing only a minority, about 33% or less, of the total non-hydrogen atoms present.

Those skilled in the art will appreciate that functional groups such as hydroxy, halo, alkoxy, nitro and cyano in a substituted hydrocarbyl group A will displace one of the hydrogen atoms of the hydrocarbyl, whilst functional groups such as carbonyl, carboxyl, tertiary amino (—N—), oxy, sulphonyl and sulphoxyl in a substituted hydrocarbyl group will displace a —CH— or —$CH_2$— moiety of the hydrocarbyl.

More preferably, the hydrocarbyl group A in formula (II) is unsubstituted or substituted by a group selected from hydroxy, halo or alkoxy group, even more preferably $C_{1-4}$ alkoxy.

In formula (I), n is in the range of from 1 to 100. Preferably, the lower limit of the range for n is 1, more preferably 2, even more preferably 3; preferably the upper limit of the range for n is 100, more preferably 60, more preferably 40, more preferably 20, and even more preferably 10 (i.e. n may be selected from any of the following ranges: from 1 to 100; from 2 to 100; from 3 to 100; from 1 to 60; from 2 to 60; from 3 to 60; from 1 to 40; from 2 to 40; from 3 to 40; from 1 to 20; from 2 to 20; from 3 to 20; from 1 to 10; from 2 to 10; and, from 3 to 10).

Another embodiment of a suitable polyamine salt derivative has the general chemical formula (II):

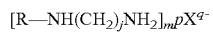

wherein R is a divalent optionally substituted hydrocarbyl group, j is from 1 to 100, m is from 1 to 4, q is from 1 to 4 and p is an integer such that pq=m and $X^{q-}$ is an anion.

In formula (II), R is preferably a divalent straight chain or branched hydrocarbyl group. That is to say, in formula (II), R is preferably an optionally substituted aromatic, aliphatic or cycloaliphatic straight chain or branched divalent hydrocarbyl group. More preferably, R is an arylene, alkylene or alkenylene group, in particular an arylene, alkylene or alkenylene group containing in the range of from 4 to 25 carbon atoms, more preferably in the range of from 6 to 25 carbon atoms, more preferably in the range of from 8 to 24 carbon atoms, more preferably in the range of from 10 to 22 carbon atoms, and most preferably in the range of from 12 to 20 carbon atoms.

In the compound of formula (II), the optional substituents in the group R are preferably selected from hydroxy, halo or alkoxy groups, especially $C_{1-4}$ alkoxy groups.

For example, the optionally substituted hydrocarbyl group R may be conveniently selected from heptyl, octyl, undecyl, lauryl, heptadecyl, heptadenyl, heptadecadienyl, stearyl, oleyl and linoleyl.

Other examples of said optionally substituted hydrocarbyl group R in formula (II) herein include $C_{4-8}$ cycloalkyls such as cyclohexyl; polycycloalkyls such as polycyclic terpenyl groups which are derived from naturally occurring acids such as abietic acid; aryls such as phenyl; aralkyls such as benzyl; and polyaryls such as naphthyl, biphenyl, stibenyl and phenylmethylphenyl.

In the present invention, the optionally substituted hydrocarbyl group R in formula (II) may contain one or more functional groups such as carbonyl, carboxyl, nitro, hydroxy, halo, alkoxy, amino, preferably tertiary amino (no N—H linkages), oxy, cyano, sulphonyl and sulphoxyl. The majority of the atoms, other than hydrogen, in substituted hydrocarbyl groups are generally carbon, with the heteroatoms (e.g., oxygen, nitrogen and sulfur) generally representing only a minority, about 33% or less, of the total non-hydrogen atoms present.

Those skilled in the art will appreciate that functional groups such as hydroxy, halo, alkoxy, nitro and cyano in a substituted hydrocarbyl group R will displace one of the hydrogen atoms of the hydrocarbyl, whilst functional groups such as carbonyl, carboxyl, tertiary amino (—N—), oxy, sulphonyl and sulphoxyl in a substituted hydrocarbyl group will displace a —CH— or —CH$_2$— moiety of the hydrocarbyl.

More preferably, the hydrocarbyl group R in formula (II) is unsubstituted or substituted by a group selected from hydroxy, halo or alkoxy group, even more preferably $C_{1-4}$ alkoxy.

In formula (II), j is in the range of from 1 to 100. Preferably, the lower limit of the range for j is 1, more preferably 2, even more preferably 3; preferably the upper limit of the range for j is 100, more preferably 60, more preferably 40, more preferably 20, and even more preferably 10 (i.e. j may be selected from any of the following ranges: from 1 to 100; from 2 to 100; from 3 to 100; from 1 to 60; from 2 to 60; from 3 to 60; from 1 to 40; from 2 to 40; from 3 to 40; from 1 to 20; from 2 to 20; from 3 to 20; from 1 to 10; from 2 to 10; and, from 3 to 10).

The anion $X^{q-}$ of the compound of formulas (I) and (II) is not critical and can be any anion (or mixture of anions) suitable to balance the positive charge of the polyamine cation.

The anion $X^{q-}$ of the compound of formulas (I) or (II) may conveniently be a sulfur-containing anion, such as an anion selected from sulfate and sulfonate anions.

However, it may be desirable to maintain a low sulfur content in the oil and gas being produced so the use of non-sulfur-containing anions in the compounds of formula (III) may be desirable depending upon the concentration of sulfur in the oil and gas and/or the desired concentration of sulfur in the oil and gas composition containing the one or more poly (hydroxycarboxylic acid) amide salt derivatives.

Therefore, the anion $X^{q-}$ of the compound of formula (III) can also be any non-sulfur-containing anion (or mixture of anions) suitable to balance the positive charge of the poly (hydroxycarboxylic acid) amide cation, such as a non-sulfur-containing organic anion or a non-sulfur-containing inorganic anion.

Non-limiting examples of suitable anions are $OH^-$, $CH^-$, $NH_3^-$, $HCO_3^-$, $HCOO^-$, $CH_3COO^-$, $H^-$, $BO_3^{3-}$, $CO_3^{2-}$, $C_2H_3O_2^-$, $HCO^{2-}$, $C_2O_4^{2-}$, $HC_2O_4^-$, $NO_3^-$, $NO_2^-$, $N^{3-}$, $NH_2^-$, $O^{2-}$, $O_2^{2-}$, $BeF_3^-$, $F^-$, $Na^-$, $[Al(H_2O)_2(OH)_4]^-$, $SiO_3^{2-}$, $SiF_6^{2-}$, $H_2PO_4^-$, $P^{3-}$, $PO_4^{3-}$, $HPO_4^{2-}$, $Cl^-$, $ClO_3^-$, $ClO_4^-$, $ClO^-$, $KO^-$, $SbOH_6^-$, $SnCl_6^{2-}$, $[SnTe4]^{4-}$, $CrO_4^{2-}$, $Cr_2O_7^{2-}$, $MnO_4^-$, $NiCl_6^{2-}$, $[Cu(CO_3)_2(OH)_2]^{4-}$, $AsO_4^{3-}$, $Br^-$, $BrO_3^-$, $IO_3^-$, $I^-$, $CN^-$, $OCN^-$, etc.

Suitable anions may also include anions derived from compounds containing a carboxylic acid group (e.g. a carboxylate anion), anions derived from compounds containing a hydroxyl group (e.g. an alkoxide, phenoxide or enolate anion), nitrogen based anions such as nitrate and nitrite, phosphorus based anions such as phosphates and phosphonates, or mixtures thereof.

Non-limiting examples of suitable anions derived from compounds containing a carboxylic acid group include acetate, oleate, salicylate anions, and mixtures thereof.

Non-limiting examples of suitable anions derived from compounds containing a hydroxyl group include phenate anions, and mixtures thereof.

In a preferred embodiment of the present invention, the anion $X^{q-}$ is a non-sulfur-containing anion selected from the group consisting of OH, a phenate group, a salicylate group, an oleate group and an acetate group; more preferably the anion $X^{q-}$ is OH.

Another preferred embodiment of an ionic liquid is a polypropylene glycol derivative of the formula (III):

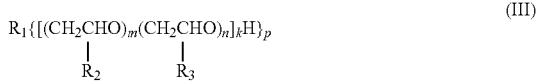

(III)

where $R_1$ is a hydroxyl group, mono or poly organic amine, or organic alcohol; $R_2$ and $R_3$ are individually hydrogen or methyl groups; m and n are positive integers less than 100; p is a positive integer less than 2000; and k is a positive integer of from 1 to 4.

The ionic liquid comprising treatment fluid may be injected into a production well, into an injection well, into the hydrocarbon production system or in any other manner known to one of ordinary skill in the art. The treatment fluid may be injected at one or more locations and more than one different treatment fluid may be injected together or separately in different locations or at different times.

It is believed that the composition comprising ionic liquids is effective at reducing the wax formation and deposition because it prevents the wax from forming and dissolves any wax that has already formed.

The method of the present invention reduces or inhibits the formation or deposition of wax as shown in the following illustrative examples.

EXAMPLES

Example 1 compares the impact on wax dissolution of using an ionic liquid in combination with xylene as opposed to using xylene by itself. In this experiment, 1 gram wax deposit samples were pressed into a pill. The first wax deposit was placed into 10 ml of xylene overnight. Then the xylene was filtered out (Sample 1) and tested using high temperature simulated distillation to determine the carbon distribution of the liquid. This can be used to quantify the amount of heavier paraffins from the wax that are dissolved in the liquid. This test was repeated using 10 ml of a xylene and polyamine salt derivative mixture where the mixture was 10 wt % polyamine salt derivative. The liquid was filtered out (Sample 2) and tested using high temperature simulated distillation. An additional high temperature simulated distillation was carried out with the xylene and the polyamine salt derivative (without any wax) (Sample 3) to determine the baseline carbon distribution of that mixture.

The results are shown in FIG. 1. The results show that the mixture of xylene and polyamine salt derivative dissolved more wax as shown by the greater amount of higher carbon number compounds (wax paraffins) in Sample 2.

The invention claimed is:

1. A method of inhibiting the formation or deposition of wax in a mixture comprising hydrocarbons, the method comprising contacting the mixture with a composition which comprises at least one ionic liquid, wherein the ionic liquid comprises a polyamine salt derivative having the formula $[NH_2(A\text{-}NH)_nH]_m pX^{q-}$, wherein A is an arylene, alkylene, or alkenylene group, n is from 1 to 100, m is from 1 to 4, q is from 1 to 4 and p is an integer such that pq=m and $X^{q-}$ is an anion or a polyamine salt derivative having the chemical formula $[R\text{—}NH(CH_2)_jNH_2]_m pX^{q-}$, wherein R is an arylene, alkylene, or alkenylene group, j is from 1 to 100, m is from 1 to 4, q is from 1 to 4 and p is an integer such that pq=m and $X^{q-}$ is an anion.

2. The method of claim 1 where the ionic liquid comprises the polyamine salt derivative having the chemical formula $[NH_2(A\text{-}NH)_nH]_m pX^{q-}$.

3. The method of claim 2, wherein A is an arylene, alkylene, or alkenylene group containing in the range of from 12 to 20 carbon atoms.

4. The method of claim 2, wherein A is an arylene, alkylene, or alkenylene group containing hydroxy, halo, or alkoxy groups.

5. The method of claim 2, wherein n is from 3 to 10.

6. The method of claim 1 where the ionic liquid comprises the polyamine salt derivative having the chemical formula $[R\text{—}NH(CH_2)_jNH_2]_m pX^{q-}$.

7. The method of claim 6, wherein R is an arylene, alkylene, or alkenylene group containing in the range of from 12 to 20 carbon atoms.

8. The method of claim 6, wherein R is an arylene, alkylene, or alkenylene group containing hydroxy, halo, or alkoxy groups.

9. The method of claim 6, wherein j is in the range of from 3 to 10.

10. The method of claim 1 wherein the ionic liquid is injected into a well head or an injection well.

11. The method of claim 1 wherein the ionic liquid is injected into a pipeline.

\* \* \* \* \*